May 2, 1933. O. L. MEEKS 1,906,395

HELICOID CONVEYER SYSTEM

Filed March 17, 1932

INVENTOR.

Oscar L. Meeks

BY

ATTORNEY.

UNITED STATES PATENT OFFICE

OSCAR L. MEEKS, OF MUNCY, PENNSYLVANIA

HELICOID CONVEYER SYSTEM

Application filed March 17, 1932. Serial No. 599,480.

My invention relates to conveyers and more particularly to shields for use adjacent the ends of spiral conveyers.

In conveyer apparatus used for conducting and conveying material of a soft or granular nature, such as cement, small or ground grain, nitrate of soda, etc., it is difficult to prevent passage of powdered particles around the conveyer shafts into the bearings journalling the shafts and into the transmission driving the shafts; it being particularly difficult to prevent such passage around conveyer shafts positioned vertically.

The principal object of my invention, therefore, is to provide a shield for constantly forcing the conveyed material radially away from the shaft and into the path of the conveyer to reduce to a minimum the possibility of powdered abrasive working into the conveyer transmission and bearings.

In accomplishing this and other objects of my invention, I have provided improved details of structure, the preferred form of which is illustrated in the accompanying drawing, wherein.

Figure 1:
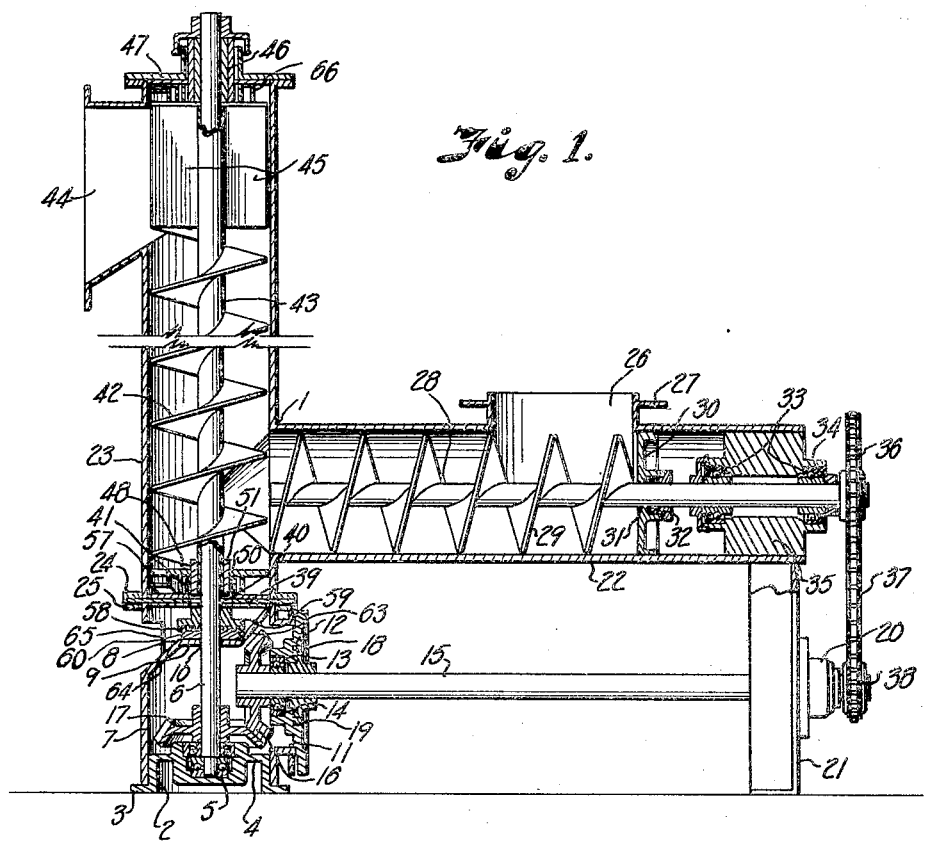
Fig. 1 is a central section of a conveyer assembly provided with shields embodying my invention.
Figure 2:
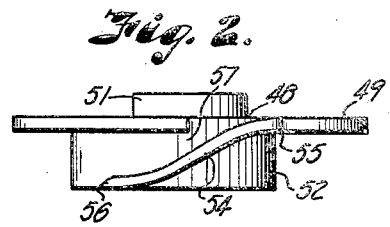
Fig. 2 is an enlarged elevational view of a shield constructed in accordance with my invention.
Figure 4:
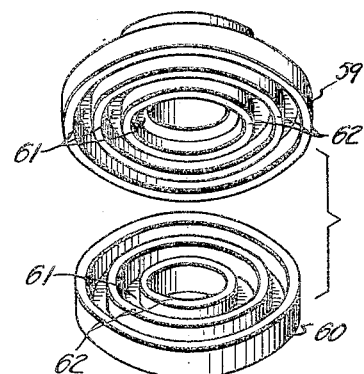
Fig. 4 is an enlarged perspective view of cooperating step-bearing members in disassociated relation.

Referring more in detail to the drawing:

1 designates a conveyer assembly including a base 2 having an outwardly directed flange 3 serving as a foot member for the base. An upper wall 4 of the base is provided with suitable bearings 5 for journalling the lower end of a vertical conveyer shaft 6.

A transmission case 7, mounted on the base, is provided with an upper wall 8 including a horizontal portion 9 having an opening 10 for receiving the vertical shaft, and a laterally flanged opening 11 of the transmission case is closed by an end plate 12 having a socket 13 seating a bearing 14 for journalling the inner end of a horizontal drive shaft 15. The inner end of the drive shaft and the lower end of the vertical conveyer shaft are operably connected by bevel gears 16 and 17 secured respectively to the drive and vertical shafts, and a bearing plate 18 having a plurality of concentric flanges 19 cooperating with corresponding grooves in the end plate 12 is mounted over the drive shaft to protect the bearing 14 from dust and the like.

The outer end of the drive shaft is mounted in a bearing 20 secured to a vertical support 21, and the member 21, together with the transmission housing, serves to support cooperating horizontal and vertical conveyer housings 22 and 23 respectively, the housing 23 having a flanged lower end 24 secured in any suitable manner to a similarly flanged end 25 of the transmission case.

As is clearly shown in Fig. 1 of the drawing, the horizontal housing is provided with an inlet 26 having an outer flange 27 to which a suitable conduit, or hopper, may be secured, and rotatably mounted in the housing on a shaft 28 is a spiral conveyer 29 for delivering material entering the housing through the inlet 26 into the vertical housing. A plate 30 in the horizontal housing, adjacent the inlet 26, is provided with a concentric opening 31 for receiving the shaft 28 which is sealed in its rotative movement through the plate by the usual packing means indicated at 32. The horizontal shaft is further journalled in the housing 22 by means of bearings 33 seated in sockets 34 of an end wall 35 and a sprocket 36 fixed to the extreme outer end of the horizontal shaft is operably connected by a chain belt 37 with a sprocket 38 secured to the outer end of the drive shaft 15, it being obvious that a source of power may be connected to the drive shaft in any suitable manner.

Referring again to the vertical housing, it will be clear from the drawing that the lower end of the latter housing and the upper end of the transmission case are closed, as indicated at 39 with the exception of a concentric opening 40 surrounded by an upstanding flange 41.

A vertical conveyer 42 having a tubular sleeve 43 mounted on the vertical shaft 6 extends upwardly into the vertical housing 23 into proximity with a lateral discharge opening 44 so that material delivered by the horizontal conveyer into the vertical housing is carried upwardly by the vertical conveyer and discharged through the opening 44. A plurality of radial paddles 45 are preferably provided on the extreme upper end of the vertical conveyer and the shaft 6 projects upwardly beyond the paddles and is journalled in a bearing 46 provided in an upper end wall 47 of the vertical housing.

Figure 3:
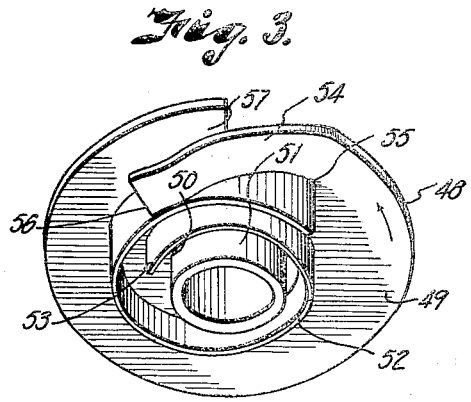
Fig. 3 is an enlarged perspective view of the shield.

In order to prevent the passage of conducted material around the vertical conveyer shaft downwardly into the transmission housing and lower bearings 5, I have provided a shield 48 comprising a disk 49 having a concentric opening 50 for receiving a sleeve 51 adapted to snugly engage the sleeved lower end of the vertical conveyer. Fixed to the lower surface of the shield, as is clearly shown in Fig. 3, is a convolute band 52 having its inner end 53 spaced from the sleeve 51 so that the flange 41 may extend upwardly into the shield between the sleeve and band to form a tortuous passage for material passing downwardly around the shield. The shield is further provided with an oblique lip 54 curving from the base of the band adjacent its outer end 55 to the lateral extremity of the band, as shown at 56, thus providing an opening 57. It will be apparent that rotation of the shield in a direction indicated by the arrow in Fig. 3 will force material outwardly against the wall of the vertical housing and upwardly through the opening 57 into the path of travel of the vertical conveyer.

To further insure against passage of material into the transmission case, a step-bearing 58 comprising mating disk members 59 and 60 respectively provided with complementary annular recesses 61 and flanges 62 are mounted on the horizontal portion 9 of the transmission housing wall, and inclined portions 63 and 64 of the wall direct material escaping around the shield, from the housing through an opening 65. A shield 66, preferably identical to the shield 48, may be mounted in inverted condition on the upper end of the vertical conveyer adjacent the paddles 45 to prevent passage of dust particles into the bearing 46.

Assuming a conveyer apparatus to be constructed and assembled as described, the operation thereof would be as follows.

A source of power connected with the drive shaft rotates both conveyers, and material delivered into the horizontal conveyer housing is discharged into the lower end of the vertical housing and carried by the vertical conveyer upwardly out of the discharge opening 44. The convolute band of the shield constantly urges the material radially away from the vertical shaft and the oblique lip 54 forces the material upwardly above the shield disk 49, into engagement with the vertical conveyer.

Should a small portion of the material escape around the shield and through the opening 40, of the lower end wall of the vertical housing, it will be deflected by the step-bearing and directed outwardly from the transmission housing through the openig 65 by means of the inclined portions 63 and 64. It will be obvious that the upper shield 66 serves in exactly the same manner as the shield in the lower end of the vertical housing for preventing passage of dust particles into the upper bearing 46.

From the foregoing, it will be apparent that I have provided a conveyer apparatus embodying a simple, but effective, means for preventing entrance of material into the bearings and transmission of the apparatus, thereby greatly reducing wear of the mechanism.

What I claim and desire to secure by Letters Patent is:

1. In combination with a conveyer housing having an end wall and a rotatable conveyer in the housing having a shaft extended through said wall, a shield on the shaft adjacent the wall including a convolute band portion for forcing material delivered to the housing radially away from the shaft.

2. In combination with a conveyer housing having an end wall and a rotatable conveyer in the housing having a shaft extended through said wall, a shield on the shaft adjacent the wall including a convolute band portion for forcing material delivered to the housing radially away from the shaft, said shield including a spiral portion for forcing said material outwardly from the end wall.

3. In combination with a conveyer housing having a lower end wall and a vertical conveyer rotatably mounted in the housing having a shaft extended through said end wall, a shield on the shaft adjacent the wall including a convolute band portion for forcing material delivered to the housing radially away from the shaft, and an annular flange on said end wall extending upwardly within the inner boundary of the band.

4. In combination with a conveyer housing having a lower end wall provided with an upstanding annular flange, and a vertical conveyer rotatably mounted in the housing having a shaft extended through said end wall, a shield on the shaft adjacent the wall including a convolute band portion of greater height than the flange to form therewith a tortuous passage, said band portion having an inner end spaced outwardly from the flange.

5. A shield of the character described including a disk, and a convolute band portion secured to one face of the disk.

6. A shield of the character described including a disk, a concentric flange on one face of the disk, and a convolute band portion on said face of the disk and surrounding the flange.

7. A shield of the character described including a disk, a convolute band portion on one face of the disk and an oblique lip on said disk in cooperating relation with the band.

8. A shield of the character described including a disk, a concentric flange on one face of the disk, a convolute band portion on said face of the disk and surrounding the flange, and an oblique lip on the disk in cooperating relation with the band.

9. A shield of the character described including a disk, a concentric flange on one face of the disk, a convolute band portion on said face of the disk surrounding the flange and having its inner end spaced from the flange.

10. A shield of the character described including a disk, a convolute band portion on one face of the disk, and an oblique lip on the disk having an inner edge adjacent to and conforming with the periphery of the band.

In testimony whereof I affix my signature.

OSCAR L. MEEKS.